United States Patent
Omura

(10) Patent No.: US 8,103,798 B2
(45) Date of Patent: Jan. 24, 2012

(54) GATEWAY FOR CONNECTING NETWORKS OF DIFFERENT TYPES AND SYSTEM FOR CHARGING FEES FOR COMMUNICATION BETWEEN NETWORKS OF DIFFERENT TYPES

(75) Inventor: Michiaki Omura, Minato-ku (JP)

(73) Assignee: NEC Corporation (JP)

( * ) Notice: Subject to any disclaimer, the term of this patent is extended or adjusted under 35 U.S.C. 154(b) by 1095 days.

(21) Appl. No.: 10/758,568

(22) Filed: Jan. 14, 2004

(65) Prior Publication Data
US 2004/0158647 A1    Aug. 12, 2004

(30) Foreign Application Priority Data
Jan. 16, 2003 (JP) ................................ 2003-007716

(51) Int. Cl.
*G06F 15/16* (2006.01)
*H04J 3/22* (2006.01)

(52) U.S. Cl. ........ 709/249; 709/230; 709/246; 370/466; 370/467

(58) Field of Classification Search .......... 709/223–229, 709/246, 249, 230; 370/352, 464–467
See application file for complete search history.

(56) References Cited

U.S. PATENT DOCUMENTS

| | | | |
|---|---|---|---|
| 6,967,956 B1 * | 11/2005 | Tinsley et al. | ................. 370/466 |
| 2001/0034599 A1 * | 10/2001 | Kage et al. | ......................... 704/3 |
| 2001/0034789 A1 * | 10/2001 | Kumagai et al. | .............. 709/233 |
| 2001/0046234 A1 * | 11/2001 | Agrawal et al. | ............... 370/402 |
| 2002/0003803 A1 | 1/2002 | Kametani | |
| 2002/0015403 A1 | 2/2002 | McConnell et al. | |
| 2002/0087711 A1 * | 7/2002 | Leung | ............................ 709/233 |
| 2002/0143975 A1 * | 10/2002 | Kimura et al. | ................. 709/231 |
| 2002/0167909 A1 * | 11/2002 | Balazinski et al. | ........... 370/252 |
| 2003/0028643 A1 * | 2/2003 | Jabri | .............................. 709/226 |

(Continued)

FOREIGN PATENT DOCUMENTS
JP    08-065390    3/1996
(Continued)

OTHER PUBLICATIONS

English Translation of Chinese Office Action issued Dec. 20, 2005 in connection with corresponding Chinese application No. 20041000363.3.

(Continued)

*Primary Examiner* — Joshua Joo
(74) *Attorney, Agent, or Firm* — Ostrolenk Faber LLP

(57) ABSTRACT

A gateway for connecting networks of different types is designed to connect a first network and a second network that uses a signal format and a protocol that are different from those of the first network. The gateway comprises a conversion section, a detection section, and a network-connecting section. When communication is performed between a terminal connected to the first network and a terminal connected to the second network, the conversion section converts a signal used in the first network to a signal to be used in the second network, and a signal used in the second network to a signal to be used in the first network. The detection section detects conversion-process information containing at least one of the time spent to convert the signal and the amount of data converted. The network-connecting section is connected to at least one of the first and second networks and transmits the conversion-process information to a fee-charging system of the first network or a fee-charging system of the second network.

8 Claims, 14 Drawing Sheets

U.S. PATENT DOCUMENTS

| | | | |
|---|---|---|---|
| 2003/0051041 A1* | 3/2003 | Kalavade et al. | 709/229 |
| 2003/0061160 A1* | 3/2003 | Asahina | 705/40 |
| 2011/0202347 A1* | 8/2011 | Moore et al. | 704/260 |

FOREIGN PATENT DOCUMENTS

| | | |
|---|---|---|
| JP | 09-018852 | 1/1997 |
| JP | 2001-331417 | 11/2001 |
| JP | 2001-358777 | 12/2001 |
| JP | 2002-111870 | 4/2002 |
| JP | 2002-176445 | 6/2002 |
| JP | 2002-176637 | 6/2002 |
| JP | 2002-290633 | 10/2002 |
| JP | 2002-368741 | 12/2002 |
| WO | WO 00/65862 | 11/2000 |
| WO | WO 00/78004 A2 | 12/2000 |
| WO | WO 02/052825 * | 7/2002 |
| WO | WO 02/073443 | 9/2002 |
| WO | WO 02/074054 | 9/2002 |
| WO | WO 02/075504 A2 | 9/2002 |

OTHER PUBLICATIONS

Communication from European Patent Office on Jun. 2, 2005 in Connection with Corresponding European Application No. 04090014.4-1244.

Untranslated Japanese Office Action issued on Jul. 4, 2007 in connection with corresponding Japanese application No. 2003-007716.

Shuichi Takahashi et al., IParty Solutions, NEC Technical Review, Aug. 23, 2002, vol. 55, Edition 8, pp. 54-57.

Search Report issued by European Patent Office on Aug. 8, 2011 in connection with corresponding EP patent application No. 04 090 014.4.

* cited by examiner

CALL-CONNECTION SIGNALING CONVERSION DATA

| Q.931 PROCESS | SIP PROCESS |
|---|---|
| a b c d e f g | 1 2 3 4 5 6 7 |
| ⋮ | ⋮ |

CODEC CONVERSION DATA

| AUDIO | AMR | G. 731. 1 |
|---|---|---|
| | hijklmn | 9012345 |
| | ⋮ | ⋮ |

| VIDEO | MPEG4 | H. 263 |
|---|---|---|
| | opqrstu | 67890123 |
| | ⋮ | ⋮ |

FIG.5

PROCESS-TIME DATA 28

| CALLING SIDE | RESPONDING SIDE | PROCESS TIME |
|---|---|---|
| 090-1234-1234 | Abcd@abcd.com | 00:15:45 |
| ... | ... | ... |

CALL CONTROL SEQUENCE

CALL CONTROL SEQUENCE

CALL CONTROL SEQUENCE (FEE-CHARGING OF 3G NETWORK SIDE AND CALL DISCONNECTION FROM 3G NETWORK)

GATEWAY FOR CONNECTING NETWORKS OF DIFFERENT TYPES AND SYSTEM FOR CHARGING FEES FOR COMMUNICATION BETWEEN NETWORKS OF DIFFERENT TYPES

BACKGROUND OF THE INVENTION

1. Field of the Invention

The present invention relates to a gateway for connecting networks of different types and generating information for use in charging fees, and also to a system for charging fees for communication between networks of different types, by using the gateway connecting networks of different types.

2. Description of the Related Art

In some cases, a TV-telephone talk is performed between a mobile telephone and a session initiation protocol terminal (hereinafter referred to as "SIP terminal"), wherein the mobile telephone is represented by the third-generation telephone (3G-324M) that enables transmission and reception of images and sound.

The network to which the third-generation telephone is connected (hereinafter referred to as "3G network") and the Internet service-provider network to which the SIP terminal is connected (hereinafter referred to as "ISP network") are of different types. The 3G network and ISP network may use different signal formats. More specifically, they may differ in terms of call connection mode and audio/video CODEC (COder DECoder).

In some cases, a gateway is used to connect the 3G network and the ISP network. The gateway has a signaling gateway (SGW) function of converting the call connection mode to accomplish call connection and a media gateway (MGW) function of converting audio/video CODEC to achieve media connection. The gateway converts signals received from one network to signals suitable for the signal format of the other network. This makes it possible to perform communication between the networks of different types.

In communication such as the TV-telephone communication, a C-Plane for controlling a call control and a U-Plane for achieving media communication are utilized. Networks of different type differ in terms of the system of controlling the C-Plane and the data format of the U-Plane. Inevitably it is necessary to use an interface that connects the C-Plane and the U-Plane, in order to accomplish communication between such networks of different types. Thus, an SGW converts the C-Plane, and an MGW converts the U-Plane.

A type of a network, an ISP network in particular, may have no system of charging fees on the basis of communication time. The network may otherwise have no system of charging fees for the connection to the network. On the other hand, fees are generally charged for the connection to the 3G network, on the basis of communication time. Hence, fees cannot be charged, in some cases, to a user of the SIP terminal, for the communication with the 3G terminal which has been initiated by call from the SIP terminal.

In a type of a network, an ISP network in particular, packet communication is employed. Video data and audio data are transmitted in the form of packets. Path for the packets of audio and video data cannot be uniquely identified. This makes it difficult, in some cases, to determine how long a single telephone talk has lasted.

In the conventional telephone communication, CELP (Code-Excited Linear Prediction) is used to perform audio coding if the communication is proceeding between fixed telephones, between G.711 phones or between PDCs (Personal Digital Cellular) Thus, the CODEC used in the communication can be uniquely determined from the terminals used. Recently, however, each terminal may have a plurality of CODECs. To accomplish communication between terminals of different types, the ability of one terminal is compared with the ability of the other terminal and ability exchange is effected in some cases to select a CODEC common to both terminals. In many cases, the ability exchange is carried out after the call connection by the U-Plane that is a path for audio and video media. In the phase of exchanging the ability, the fee-charging system on the calling side may start charging fee in some cases when the data passes through the U-Plane. If no CODECs that enable talks are available as the result of the ability exchange, however, any talk will be impossible and the call will be cut. Assume that it takes one second to exchange the ability and that the fee is charged in units of, for example, three minutes. Then, the fee for three minutes will be charged for the ability exchange, though the users cannot talk at all.

It is desired that the fee-charging be started when the end-to-end (terminal to terminal) connection is achieved, making communication possible.

An invention relating to a network system has been made (for example, see JP-A-2001-358777). In the network system, the IP (Internet Protocol) packet that accords with the service demanded by a terminal is transmitted to a service provider via a plurality of IP networks of different protocols. Then, the service is supplied to the terminal by using the IP packet transmitted from the service provider via the plurality of IP networks. This network system is characterized in that a packet-converting means is provided between the IP networks. The packet-converting means converts the format of any transmitted IP packet to the format of the IP network to which the IP packet should be sent.

A data-distribution system is disclosed (for example, see JP-A-2002-176637). This system comprises at least a user terminal and a contents server, which are connected via a network. In the system, contents data is distributed from the contents server to the user terminal at the request of the user terminal. The system has an authentication device that is connected via the network and issues digital identification information to the user terminal and the contents server; a data-converting device that converts, at the request of the user terminal, the data-conversion device the contents data to data of such a format that the user terminal can process; and a fee-charging device that charges fee for the distribution of contents data and the conversion of the contents data, at the requests made by the contents server and data-converting device. The user terminal, the data-converting device and the fee-charging device can transmit and receive data when they are successfully authenticated on the basis of the digital identification information issued from the authentication device.

A communication system is disclosed (for example, see JP-A-2002-176445). This system comprises a plurality of communication networks of different communication schemes, to which mobile terminals can be connected and which can be connected via the Internet by using the Internet protocol. The system has a service network that manages the fee-charging information about the mobile terminals and provides service to the mobile terminals; an HA (Home Agent) device of mobile IP (Internet Protocol) that is provided in the service network, always manages to determine in which network each mobile terminal exists and distributes received data to an appropriate network via the Internet; and FA (Foreign Agent) devices of mobile IP that transmit, each provided in one communication network and designed to transmit a position-registering request to the HA device, and to transfer data received from the HA device via the Internet to the mobile terminal. Note that the position-registering request has been made to register the position of the mobile terminal that exists in the communication network. In this system, the communication between the communication networks and the communication relay over the communication networks can be freely accomplished by using the position-registering request exchanged between the HA device and the FA devices and the responses to the position-registering request.

SUMMARY OF THE INVENTION

An object of the present invention is to provide a gateway for connecting networks of different types and generating information for use in charging fees even if the network to which a calling terminal is connected has no system for charging fees on the basis of connection, and also to provide a system for charging fees for communication between networks of different types, by using the gateway connecting networks of different types.

Another object of the present invention is to provide a gateway for connecting networks of different types and generating information for use in charging fees on the basis of communication time even if it is difficult to charge fees on the basis of communication time in the network to which a calling terminal is connected, and also to provide a system for charging fees for communication between networks of different types, by using this gateway connecting networks of different types.

Still another object of the present invention is to provide a gateway for connecting networks of different types and generating information for use in charging fees if ability exchange is successfully achieved before the communication is performed, and also to provide a system for charging fees for communication between networks of different types, by using the gateway connecting networks of different types.

According to the invention, there is provided a gateway for connecting a first network and a second network that uses a signal format different from that of the first network. The gateway comprises: a conversion section which converts a signal used in the first network to a signal to be used in the second network, and a signal used in the second network to a signal to be used in the first network, when communication is performed between a terminal connected to the first network and a terminal connected to the second network; a detection section which detects conversion-process information containing at least one of the time spent to convert data and the amount of data converted; and a network-connecting section which is connected to at least one of the first and second networks and which transmits the conversion-process information to a fee-charging system of the first network or a fee-charging system of the second network.

In the gateway for connecting networks of different types, according to the invention, the conversion section converts at least one of a call-control signal generated by call-connection signaling, an audio signal generated by an audio CODEC and a video signal generated by a video CODEC.

The conversion section of the gateway for connecting networks of different types, according to the invention, comprises a signaling gateway unit, which converts thee call-control signal, and a media gateway unit that converts the audio signal and the video signal.

The detecting section of the gateway detects the conversion-process information used in a conversion process in the media gateway unit. In some cases, the detection section is included in the media gateway unit.

In the gateway for connecting networks of different types, according to the present invention, the conversion of the call-control signal is conversion between a Q.931 signal and an SIP signal, the conversion of the audio signal is conversion between an AMR bit stream and a G.723.1 signal, and the conversion of the video signal is conversion between an MPEG4 bit stream and an H.263 signal. The detecting section detects the time spent in converting the audio signal and the video signal, or the amount of the data converted.

A system for charging fees for communication between networks of different types, according to the present invention, comprises: a first terminal which perform a call control; a second terminal which responds to the call control performed by the first terminal; a first network to which the first terminal is connected; a second network to which the second terminal is connected; and a gateway which connects the first network and the second network. The first network and the second network use different signal formats. The first network comprises a fee-charging system.

The gateway converts a signal from the first network to one suitable for the signal format of the second network and transmits the signal to the second network, converts a signal from the second network to one suitable for the signal format of the first network and transmits the signal to the first network, detects conversion-process information containing at least one of the time spent to convert the signal and the amount of data converted, and transmits the conversion-process information to the fee-charging system on the calling side, in order to accomplish communication between the fist terminal and the second terminal. The fee-charging system performs a fee-charging process in accordance with the conversion-process information, to charge a fee on a user of the first terminal that is the calling side.

The gateway of the system for charging fees for communication between networks of different types, according to the present invention, detects the conversion-process information after the first terminal and the second terminal have been connected to each other.

The gateway of the system for charging fees for communication between networks of different types, according to the present invention, detects the conversion-process information about at least one of a signal generated by an audio CODEC and a signal generated by a video CODEC.

A method of charging fees for communication between networks of different types, according to the present invention, comprises the steps of: connecting a first network and a second network using a signal format different from that of the first network, by means of a gateway which converts a communication signal from a first terminal connected to the first network, to one suitable for the signal format of the second network and converts a communication signal from a second terminal connected to the second network, to one suitable for the signal format of the first network; detecting conversion-process information containing at least one of the time spent to convert a signal and the amount of data converted, said signal having been transmitted after the first terminal and the second terminal have been connected to each other, by the gateway; transmitting the conversion-process information to a fee-charging system of the network to which the first or second terminal that is a calling side is connected, by the gateway; and charging a fee on a user of the calling-side terminal, said fee being fixed or calculated on the basis of communication time, based on the conversion-process information, by the free-charging system.

In the method of charging fees for communication between networks of different types, according to the present invention, the conversion-process information includes at least one of the time spent to convert signals in an audio CODEC and a video CODEC and the amount of data converted therein.

BRIEF DESCRIPTION OF THE DRAWINGS

In the accompanying drawings:

FIGS. 4A and 4B illustrate examples of CODEC conversion data;

FIG. 5 shows an example of processed data, in which the process time is associated with a calling-side ID and a responding-side ID;

DETAILED DESCRIPTION OF THE PREFERRED EMBODIMENTS

A gateway for connecting networks of different types, which is an embodiment of the invention, and a system for charging fees for communication between networks of different types, which is an embodiment of the invention, will be described below with reference to the accompanying drawings.

Figure 1:
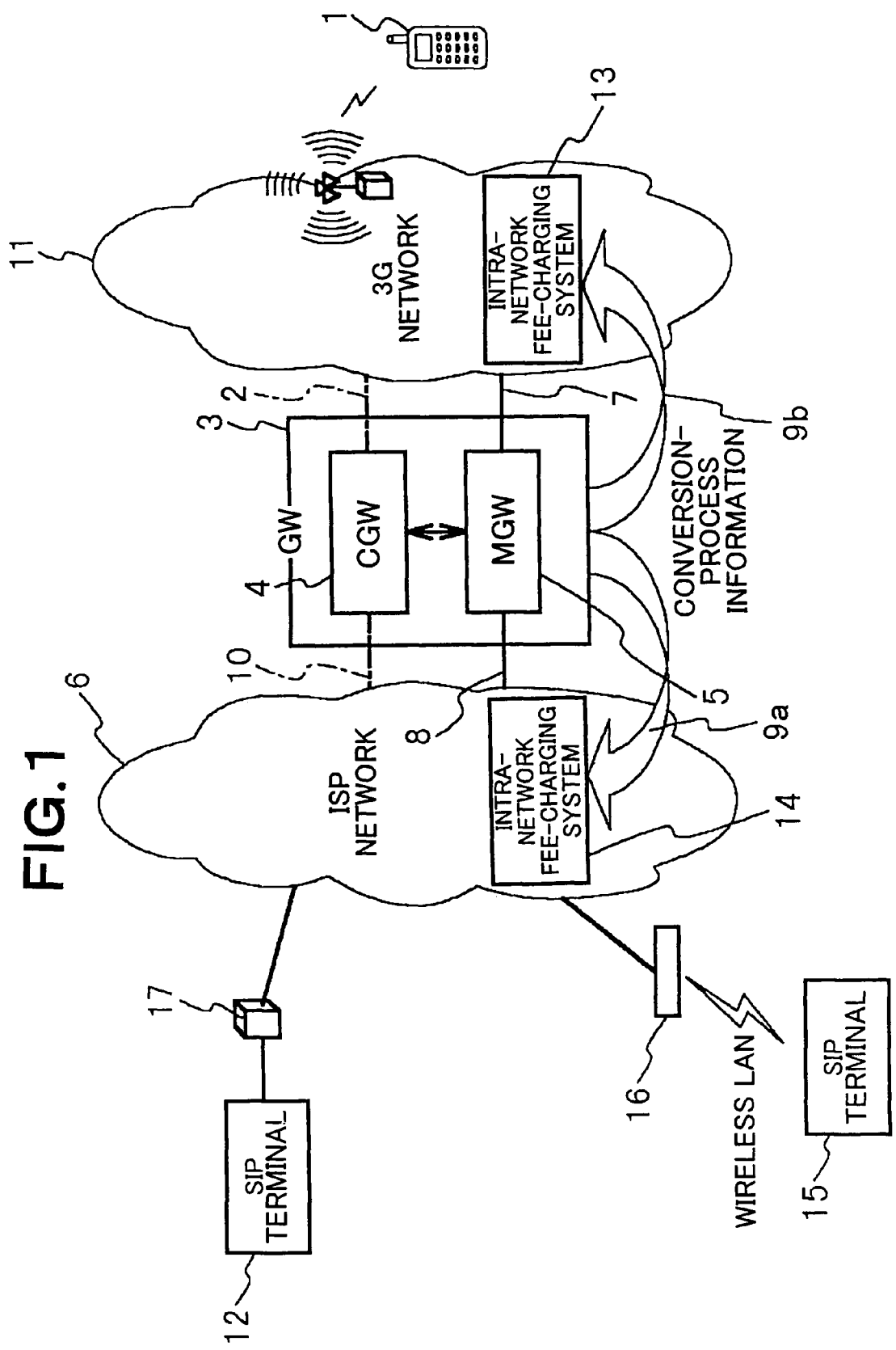
FIG. 1 outlines a communication system that uses networks of different types according to the present invention.

FIG. 1 outlines a communication system that uses networks of different types, according to the present invention. 3rd-generation mobile telephone 1 (hereinafter referred to as "3G terminal") is connected to telephone network 11 (hereinafter referred to as "3G network") that is used to connect 3rd-generation mobile telephones. The 3G terminal 1 is, for example, a 3G-324M terminal. The 3G terminal 1 is a terminal for mobile multimedia that are standardized by 3GPP (3rd Generation Partnership Project). It can accomplish talks over the audio-visual TV telephone that presents audio data and video data.

Session initiation protocol terminal 12 (hereinafter referred to as "SIP terminal") is connected to Internet service-provider network 6 (hereinafter referred to as "ISP network") that is incorporated in the Internet. The SIP terminal 12 is a terminal that the software stored in a personal computer (hereinafter referred to as "PC"), a PDA (Psesonal Digital Assistants) or the like connects to the ISP network, by using SIP (Session Initiation Protocol). The SIP terminal 12 can accomplish talks over the audio-visual TV telephone, too. In many cases the SIP terminal is mounted as software on a PC (Personal Computer), which is connected to the ISP network 6.

The SIP terminal 12 is connected to the ISP network 6 by firewall proxy 17 in some cases. Another SIP terminal 15 is connected to the ISP network 6 by wireless LAN (Local Area Network) 16 in some cases.

Gateway 3 is provided to connect the 3G network 11 and the ISP network 6 to each other. The gateway 3 may be connected to the 3G network 11 via the ISDN (Integrated Services Digital Network) network in some cases. Alternatively, the gateway 3 may be connected to the ISP network 6 via the Internet.

The gateway 3 comprises signaling gateway 4 (hereinafter referred to as "SGW") and media gateway 5 (hereinafter referred to as "MGW"). The SGW 4 converts the call connection mode to accomplish call connection. The MGW 5 converts the audio/video CODEC to achieve media connection. The gateway 3 converts a signal received from one network, to one that accords with the signal format of the other network, and then transmits the signal thus converted. Thus, communication can be performed between the networks of different types.

More precisely, a C-Plane for controlling a call control and a U-Plane for achieving media communication are employed. Networks of different types differ from one another in terms of the control mode of the C-Plane and the data format of the U-Plane. In order to realize communication between the networks of different types, interfaces must be used to connect the C-Plane and U-Plane of one network to those of the other network. Thus, the SGW 4 and MGW 5 convert the C-Plane and U-plane of each network, respectively.

The 3G terminal 1 and the SIP terminal 12 storing Windows (trademark, SIP-terminal software) may enter into TV-telephone connection. In this case, the 3G terminal 1 uses Q.931 call control, AMR (Advanced Multi Rate CODEC) audio CODEC and MPEG4 (Moving Picture Experts Group phase 4) video CODEC, while the SIP terminal 12 uses SIP call control, G.723.1 audio CODEC and H.263 video CODEC. The networks use different signaling modes, Q.931 ⇔ SIP; they use different audio CODECs, AMR⇔G.723.1; and they use different video CODECs, MPEG4⇔H.263.

Therefore, the SGW 4 performs conversion between Q.931 and SIP, and the MGW 5 performs conversion between AMR and G.723.1 and conversion between MPEG4 and H.263.

The gateway 3 generates conversion-process information that contains at least one of the time spent to convert data and the amount of data converted. The gateway 3 transmits the conversion-process information to fee-charging system (13 or 14) provided in the calling network. If the communication is one for which the responding side should pay the fee, like a collect call, the conversion-process information can be transmitted to the fee-charging system provided in the responding network.

In FIG. 1, signal 2 is the C-Plane signal exchanged between the 3G network 11 and the SGW 4, and signal 10 is the C-Plane signal exchanged between the ISP network 6 and the SGW 4. Further, signal 7 is the U-Plane signal exchanged between the 3G network 11 and the MGW 5, and signal 8 is the U-Plane signal exchanged between the ISP network 6 and the MGW 5. Nonetheless, the numerals 2, 7, 8 and 10 designating these signals do not mean that two lines connect the 3G network 11 and the gateway 3, and that two lines connect the ISP network 6 and the gateway 3. Rather, the numerals represent types of signals.

The SGW 4 and the MGW 5, both incorporated in the gateway 3, are function blocks. In the actual apparatus, they may be physically separated from each other or combined integral with each other. The SIP terminal 12 may be replaced with a terminal of any other type, such as an H.323 terminal.

The ISP network 6 may have intra-ISP-network fee-charging system 14. The fee-charging system 14 may be a system that first detects a connection of the SIP terminal 12 or 15 to the ISP network 6 and then charge a fee for the connection. Alternatively, the fee-charging system 14 may be a system that charges a fixed fee on a subscriber (user of the SIP terminal) who is permitted to access the ISP network 6. The fee-charging system 14 is not limited to these two types. Rather, it may be of any other type that can charge fees on subscribers. The fee-charging system 14 determines the fee from the conversion-process information that has been transmitted from the gateway 3 and charges the fee on the subscriber.

The intra-ISP-network fee-charging system 14 may be of any type that can charge fees on subscribers. Even if it cannot charge a fee on the basis of connection time, the fee-charging system 14 can charge fees.

In some cases, no fee-charging system is provided. Hence, only the write to access the ISP network 6 is given to a subscriber who can always connect his or her SIP terminal 12 to the ISP network 6 and wants to connect the his or her SIP terminal 12 to the 3G terminal 1 on the 3G network 11. Since the ISP network 6 has the fee-charging system 14 that receives conversion-process information 9a from the gateway 3 and charges fees, it is possible to charge fees for communication between the networks of different types.

Further, the fee-charging system 14 may have, in some cases, a function of sending part of the fee to the intra-3G-network fee-charging system 13 provided in the 3G network 11, in accordance with the conversion-process information 9a. This function enables the networks of different types to charge fees even if the caller uses a network to which he or she is not a subscriber.

The 3G network 11 has the intra-3G-network fee-charging system 13. The 3G network 11 is represented by a telephone network and therefore has a system that charges a fee on the basis of the time of using the network. A call is made from the 3G terminal 1 so that communication is made between the 3G terminal 1 and the SIP terminal 12. If so, the ISP network 6 may receive conversion-process information 9b from the gateway 3 and can therefore charge a fee for its use, either at a fixed amount or on the basis of use time.

Moreover, the intra-3G-network fee-charging system 13 may have, in some cases, the function of sending part of the fee to the intra-ISP-network fee-charging system 14, in accordance with the conversion-process information 9b. This function enables the networks of different types to charge fees even if the caller uses a network to which he or she is not a subscriber.

Figure 2:
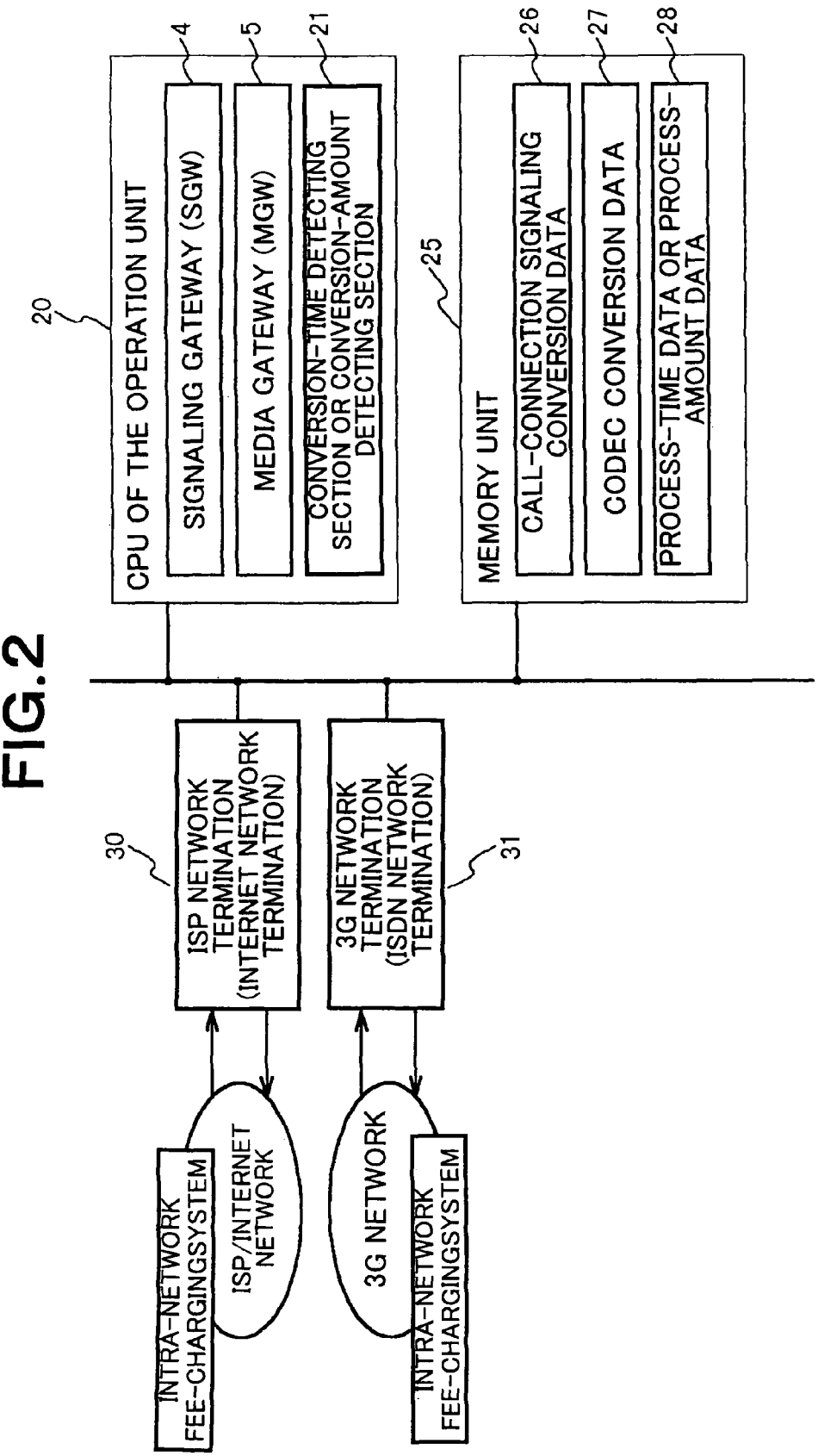
FIG. 2 depicts the configuration of a gateway.

FIG. 2 shows the configuration of the gateway 3. The gateway 3 comprises operation unit 20, memory unit 25, ISP-network termination unit 30, and 3G-network termination unit 31.

The operation unit 20 is a unit that includes a CPU (Central Processing Unit). It comprises the signaling gateway (SGW) 4, the media gateway (MGW) 5, conversion-time detecting section or conversion-amount detecting section 21 (hereinafter referred to as "conversion-process detecting section 21").

Figure 3:
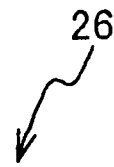
FIG. 3 illustrates an example of call-connection signaling conversion data.

The signaling gateway 4 converts call-connection signaling. To state more specifically, the signaling gateway 4 converts the Q.931-signals for use in the 3G terminal and also the SIP process for use in the SIP terminal. In some case, the signaling gateway 4 may perform the conversions, by referring to call-connection signaling conversion data 26 stored in the memory unit 25. FIG. 3 represents an example of the call-connection signaling conversion data 26.

The media gateway 5 converts CODECs including an audio CODEC and a video CODEC. More precisely, the media gateway 5 converts the AMR audio CODEC used in the 3G terminal and the G.723.1 audio CODEC used in the SIP terminal, and also converts the MPEG4 video CODEC used in the 3G terminal and the H.263 video CODEC used in the SIP terminal. In some cases, the media gateway 5 may perform the conversions, by referring to CODEC conversion data 27 stored in the memory unit 25. FIG. 4 illustrates an example of CODEC conversion data 27. The CODEC conversion data 27 contains audio data and video data that are shown in FIG. 4A and 4B, respectively.

The conversion-time detecting section or conversion-amount detecting section 21 detects the time or amount of the CODEC conversion process carried out in the media gateway 5 (hereinafter, the time or amount of the CODEC conversion process shall be called "conversion-process information"). The time or amount thus detected is stored, as process-time data or process-amount data 28 (hereinafter referred to as "processed data 28"), in the memory unit 25 in association with the identifier of the calling side. FIG. 5 shows an example of the processed data 28, in which the process time is associated with the calling-side ID and the responding-side ID.

This conversion-process information is transmitted from the termination unit (30 or 31) to the fee-charging system (14 or 13) that is incorporated in the calling side.

The conversion-time detecting section or conversion-amount detecting section 21 may be included in the media gateway 5 in some cases. In other cases, the media gateway 5 may have the function of detecting the conversion time or conversion amount.

The memory unit 25 is a memory device for storing data. The memory unit 25 stores the call-connection signaling conversion data 26, the CODEC conversion data 27, and the process-time data or process-amount data 28 (processed data 28).

The ISP-network termination unit 30 is connected to the ISP network 6. If the ISP-network termination unit 30 is connected to the ISP network 6 via the Internet, it may be connected to the Internet in some cases. Signals from the ISP network 6 are input to the ISP-network termination unit 30. Signals to be transmitted to the ISP network 6 are output from the ISP-network termination unit 30.

The 3G-network termination unit 31 is connected to the 3G network 11. If the 3G-network termination unit 31 is connected to the 3G network 11 via the ISDN network, it may be connected to the ISDN network in some cases. Signals from the 3G network 11 are input to the 3G-network termination unit 31. Signals to be transmitted to the 3G network 11 are output from the 3G-network termination unit 31.

The ISP-network termination unit 30 and the 3G-network termination unit 31 work as interface between the gateway 3 and each network.

Figure 6:
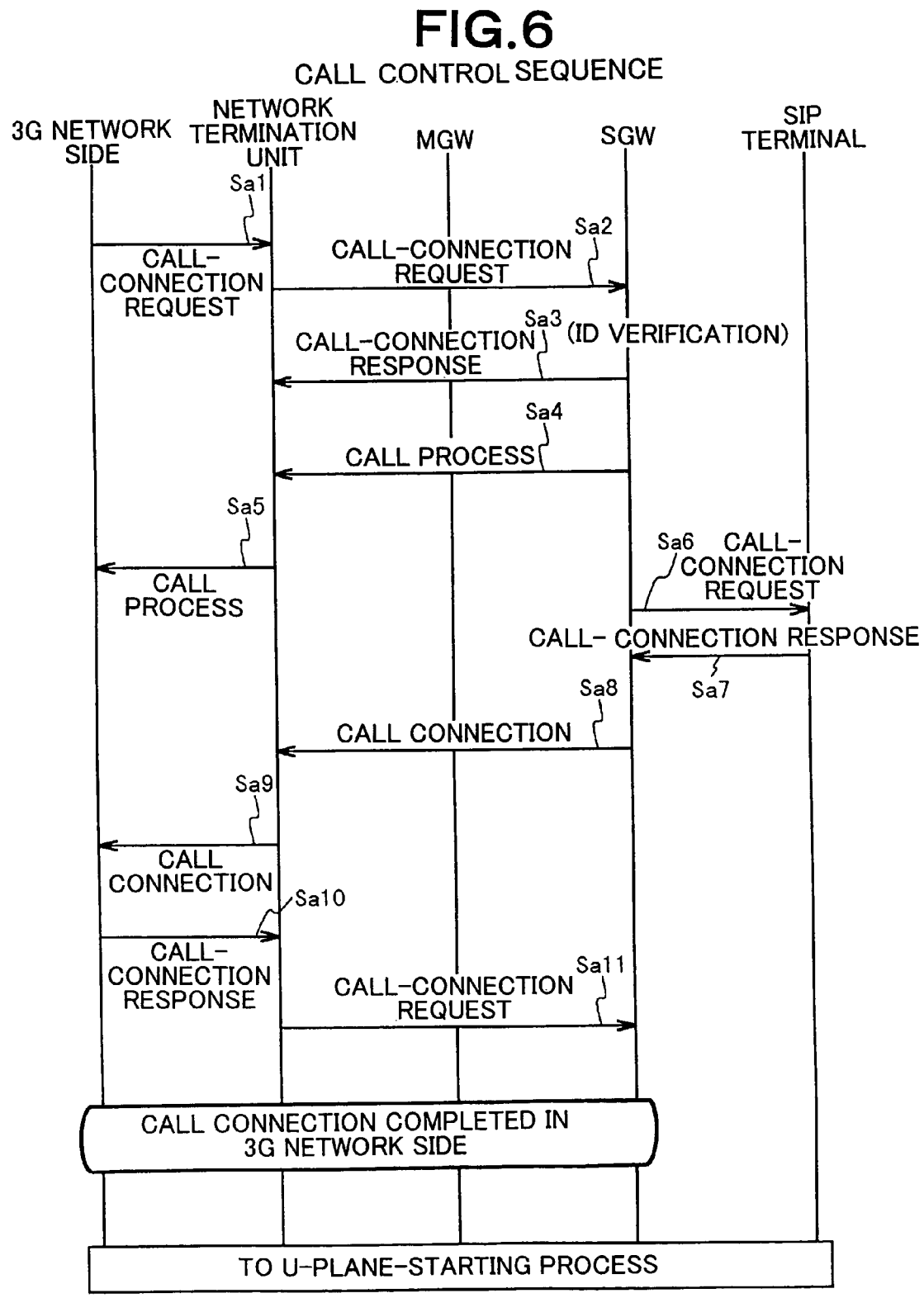
FIG. 6 illustrates a part of a call-connecting sequence that connects a 3G terminal, i.e., a calling terminal, to an SIP terminal.
Figure 7:
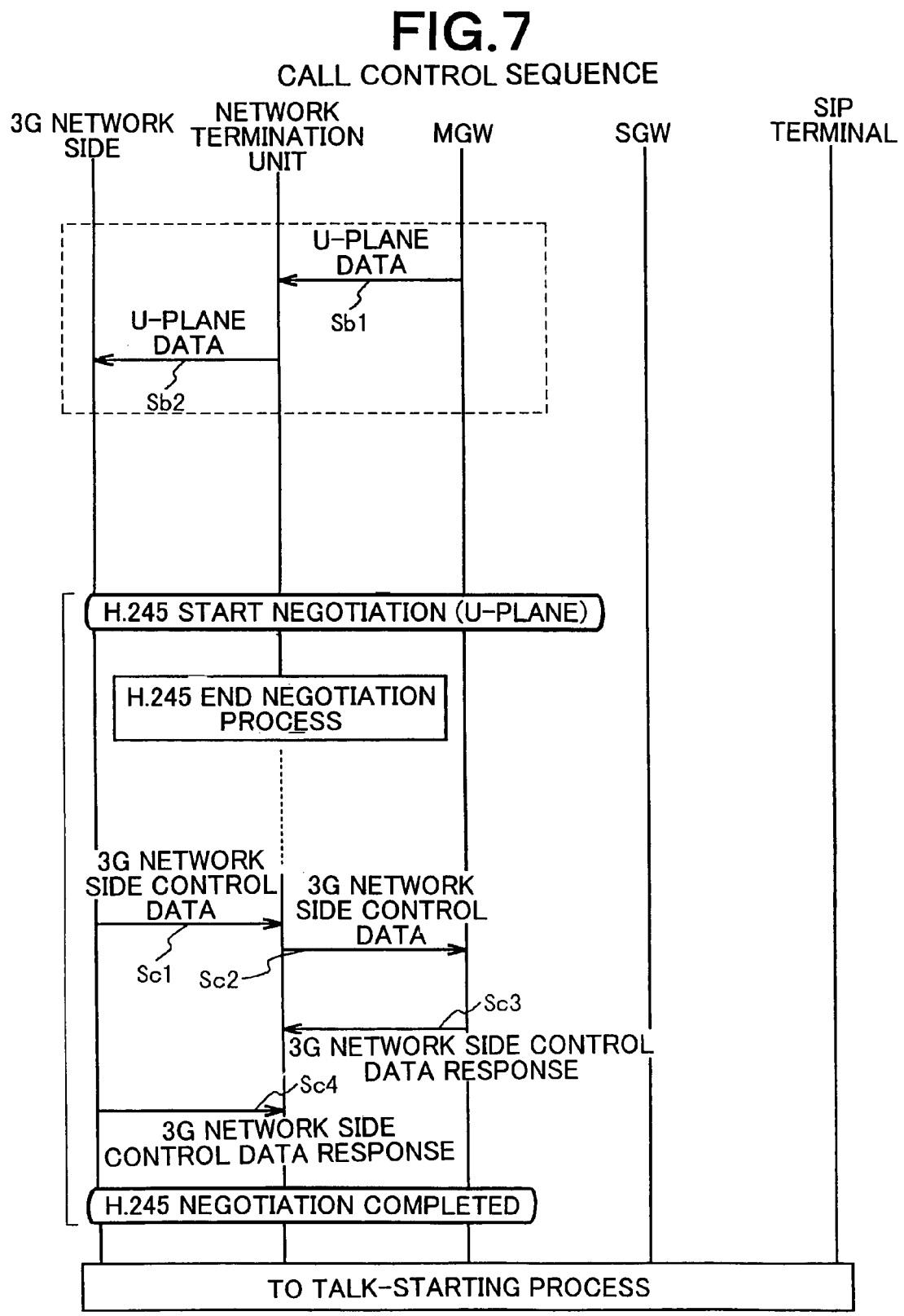
FIG. 7 illustrates another part of the call-connecting sequence that connects a 3G terminal, i.e., a calling terminal, to an SIP terminal.
Figure 8:
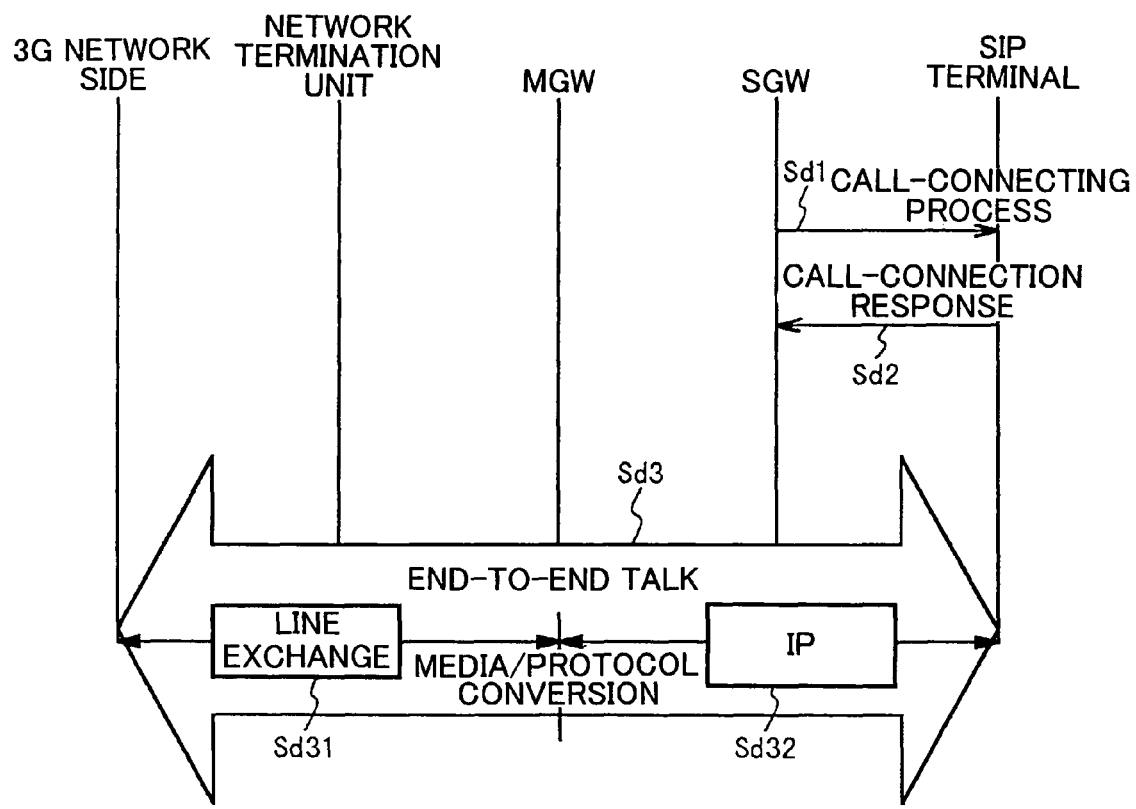
FIG. 8 illustrates the remaining part of the call-connecting sequence that connects a 3G terminal, i.e., a calling terminal, to an SIP terminal.

The call-connecting sequence for connecting the 3G terminal 1 to the SIP terminal 12, which is started as the 3G terminal 1 makes a call, will be described with reference to FIGS. 6, 7 and 8.

A signal is transmitted from the 3G terminal 1 to the 3G network 11, demanding that the 3G terminal 1 be connected to the SIP terminal 12. The 3G network 11 determines that the identifier of the called side is a call to a terminal in a different type network. The 3G network 11 then transmits a call-connection request signal Sa1 to the gateway 3. The call-connection request signal Sa1 is input to the 3G-network termination unit 31. Further, a call-connection request signal Sa2 is sent from the 3G-network termination unit 31 to the signaling gateway 4.

The signaling gateway 4 verifies the transmitted identifier and transmits a call-connection response signal Sa3 to the 3G-network termination unit 31. Then, the signaling gateway 4 sends a call-control signal Sa4 to the 3G-network termination unit 31. The 3G-network termination unit 31 sends the call-control signal Sa4 to the 3G network 11.

Furthermore, the signaling gateway 4 converts the call-connection request signal Sa2 to a call-connection request signal Sa6. The signal Sa6 is transmitted to the designated SIP terminal 12 through the ISP-network termination unit 30 and ISP network 6. In response to the call-connection request signal Sa6, the designated SIP terminal 12 transmits a call-connection response signal Sa7 to the signaling gateway 4 through the ISP network 6 and the ISP-network termination unit 30. The signaling gateway 4 converts the call-connection response signal Sa7 to a call-connection signal Sa8, which is sent to the 3G-network termination unit 31. The 3G-network termination unit 31 transmits a call-connection signal Sa9 to the 3G network 11. In response to the call-connection signal Sa9, the 3G-network termination unit 31 sends a call-connection response signal Sa10. The 3G-network termination unit 31 receives the signal Sa10 via the 3G network 11. A call-connection response signal Sa11 is sent to the signaling gateway 4 from the 3G-network termination unit 31. This exchange of signals completes the call connection requested by the 3G network 11.

The sequence starting with the call-connection request signal Sa1 and ending with the call-connection response signal Sa11 is carried out by the C-plane.

As described above, the signaling gateway 4 converts the call-connection request signal Sa2 used in the 3G network 11, to the call-connection request signal Sa6 used in the ISP network 6, and the call-connection response signal Sa7 used in the IPS network 6 to the call-connection response signal Sa8 used in the 3G network.

Upon completion of the call connection, the media gateway 5 transmits U-Plane data Sb1 to the 3G-network termination unit 31. The 3G-network termination unit 31 sends U-Plane data to the 3G network.

Next, negotiation for the ability exchange is performed by the U-Plane that uses a communication control protocol. The communication control protocol used is represented by H.245. 3G-side control data Sc1 is sent from the 3G network to the 3G-network termination unit 31. 3G-side control data Sc2 is sent from the 3G-network termination unit 31 to the media gateway 5.

A 3G-side control data response signal that contains information representing whether the media gateway 5 has sufficient ability is output via the 3G-network termination unit 31, as 3G-side control data response signal SC4, to the 3G network. If the 3G-side control data response signal contains information representing that the media gateway 5 has sufficient ability, it will be determined that the ability exchange has succeeded and the negotiation will be completed.

If the 3G-side control data response signal contains information representing that the media gateway 5 does not have sufficient ability, another 3G-side control data response signal will be transmitted and the negotiation will be repeated.

If all 3G-side control data items represent that the media gateway 5 does not have sufficient ability, the connection will be disconnected.

If the negotiation ends in success, a talk-starting process will be carried out. That is, when the negotiation is successful, the signaling gateway 4 transmits a call-connection process signal to the SIP terminal 12 via the ISP-network termination unit 30 and ISP network 6. The SIP terminal 12 transmits a call-connection response signal Sd2 to the signaling gateway 4 via the ISP network 6 and ISP-network termination unit 30. A talk is thereby started.

Line exchange Sd31 is used between the 3G network and the media gateway 5, and Internet protocol Sd32 is used between the mediate gateway 5 and the SIP terminal 12. The media gateway 5 performs a media/protocol conversion process. More specifically, the conversion process in the media gateway 5 includes conversion between AMR and G.723.1 and conversion between MPEG4 and H.236.

The above description is concerned with the case where a call is made from the 3G network. When a call is made from the ISP network 6, similar processes are performed, which will not be explained here.

Figure 9:
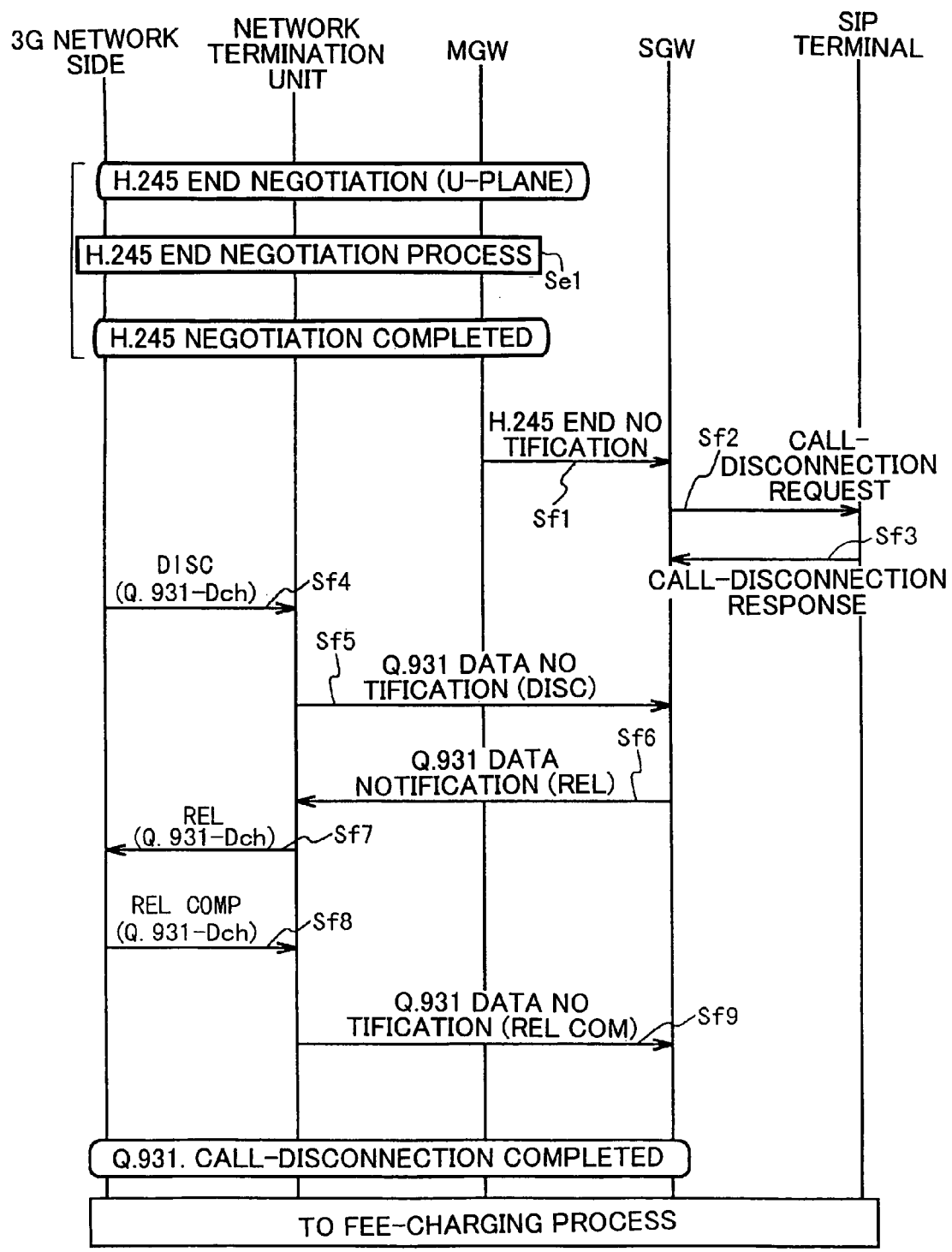
FIG. 9 shows a part of a call-disconnecting sequence that disconnects a call from a 3G network, in the case where the fee is charged on a user in the 3G network.
Figure 10:
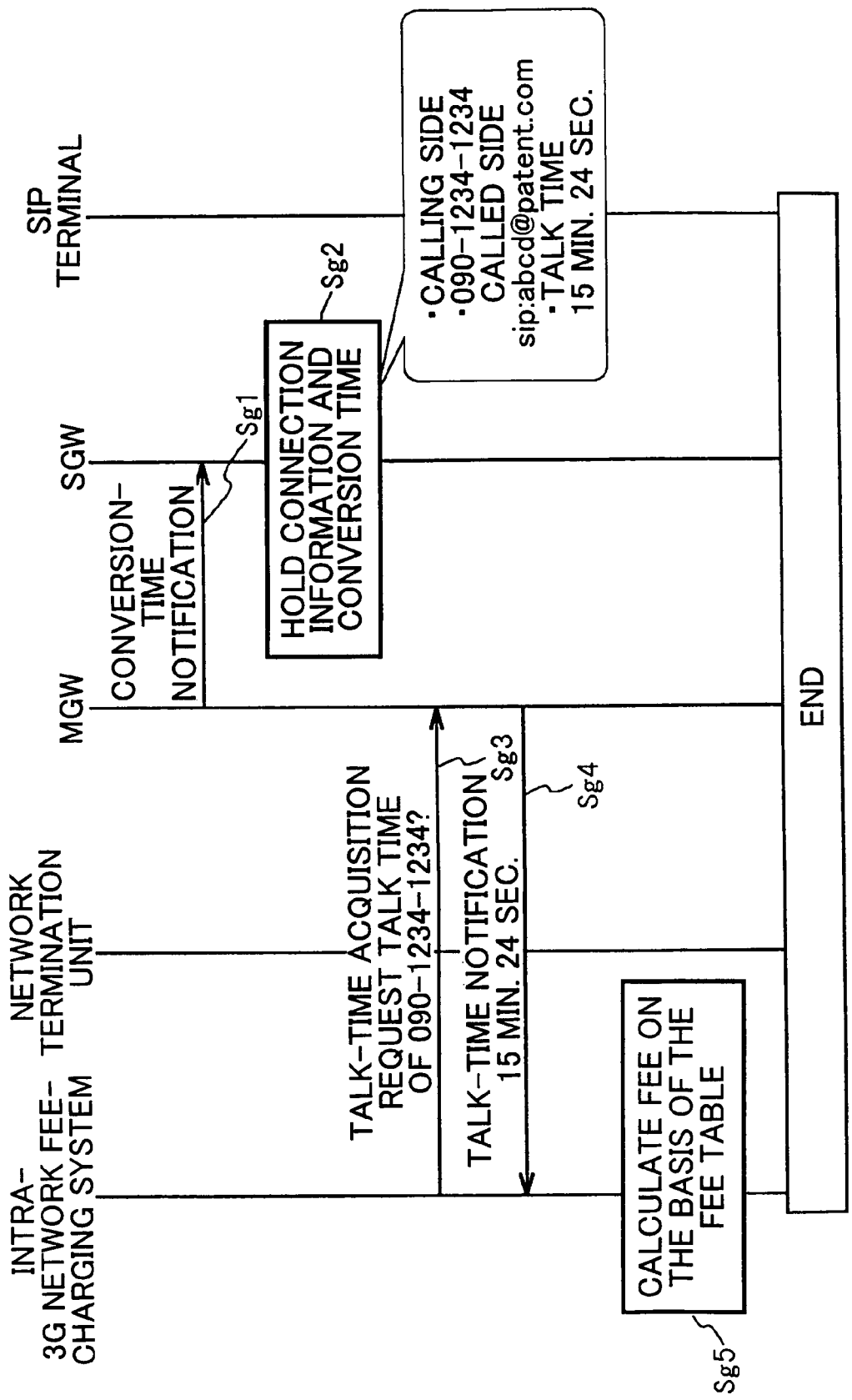
FIG. 10 shows the remaining part of the call-disconnecting sequence that disconnects a call from a 3G network, in the case where the fee is charged on a user in the 3G network.

With reference to FIGS. 9 and 10, it will be described how a call-disconnecting sequence is performed to disconnect a call from the 3G network if the 3G network has made the call and the fee is charged on the 3G network.

End negotiation process Se1 is carried out by using the communication protocol of a U-plane represented by H.245, between the 3G network and the media gateway 5.

When the end negotiation process Se1 ends, the media gateway 5 transmits an H.245-end notifying signal Sf1 to the signaling gateway 4. The signaling gateway 4 transmits a call-disconnection request signal Sf2 to the SIP terminal 12. The SIP terminal 12 sends back a call-disconnection response signal Sf3 to the signaling gateway 4.

When the end negotiation process Se1 comes to an end, a disconnection (DISC) signal Sf4 is input from the 3G network to the 3G-network termination unit 31, by using the D channel of Q.931. A Q.931 notification Sf5 is then input from 3G-network termination unit 31 to the signaling gateway 4. In response to the Q.931 notification Sf5, the signaling gateway 4 sends a Q.931 notification Sf6 that contains a release (REL) signal, back to the 3G-network termination unit 31. The release (REL) signal Sf7 is transmitted from the 3G-network termination unit 31 to the 3G network, by using-the D channel of Q.931.

In response to the release (REL) signal Sf7, the 3G network sends a release-completion (REL COMP) signal Sf8 back to the 3G-network termination unit 31, by using the D channel of Q.931. A Q.931 notification containing the release-completion (REL COMP) signal is input to the signaling gateway 4 from the 3G-network termination unit 31. Thus, the disconnection process is completed.

When the disconnection process is completed, the media gateway 5 transmits a conversion-time notification Sg1 to the signaling gateway 4. Note that the notification Sg1 contains the conversion process time, i.e., the time used to convert data when an end-to-end (terminal-to-terminal) talk is made. The conversion-process information detecting section 21 may detect the conversion-process time in some cases. The signaling gateway 4 holds the conversion-process time data in association with the connection information that contains the terminal ID of the calling side and the terminal ID of the called side. Alternatively, the conversion-process time data is stored in the processed data 28 in the memory unit 25.

In some cases, the amount of data processed may be used in place of the conversion process time.

The fee-charging system in the calling side (i.e., intra-3G-network fee-charging system 13) transmits a talk-time acquisition request for the terminal ID of the calling side, to the signaling gateway 4. The signaling gateway 4 transmits a talk-time notification Sg4 including a talk time to the intra-3G-network fee-charging system 13.

The intra-3G-network fee-charging system 13 calculates the fee for the talk, on the basis of a fee table, and charges the fee on the subscriber who has the 3G terminal 1 that has made a call. The intra-3G-network fee-charging system 13 may be configured to send part of the fee received from the subscriber, to the intra-ISP-network fee-charging system incorporated in the ISP network 6. In this case, an access can be made to the ISP network 6 from any other network, by making a payment to the ISP network 6.

Thus, the gateway 3 detects the time of conversion process or the amount of data processed to achieve the end-to-end (terminal to terminal) talk via the media gateway 5, and sends the time of conversion process or the amount of data processed, to the fee-charging system of the calling side. This makes it possible to charge fees for communication between the networks of different types. Additionally, fees may not be charged when the ability exchanges fails.

In the case described above, the call is disconnected from the 3G network 11. Nonetheless, it does not matter from which side the call is disconnected, from the 3G network or the ISP network.

Figure 11:
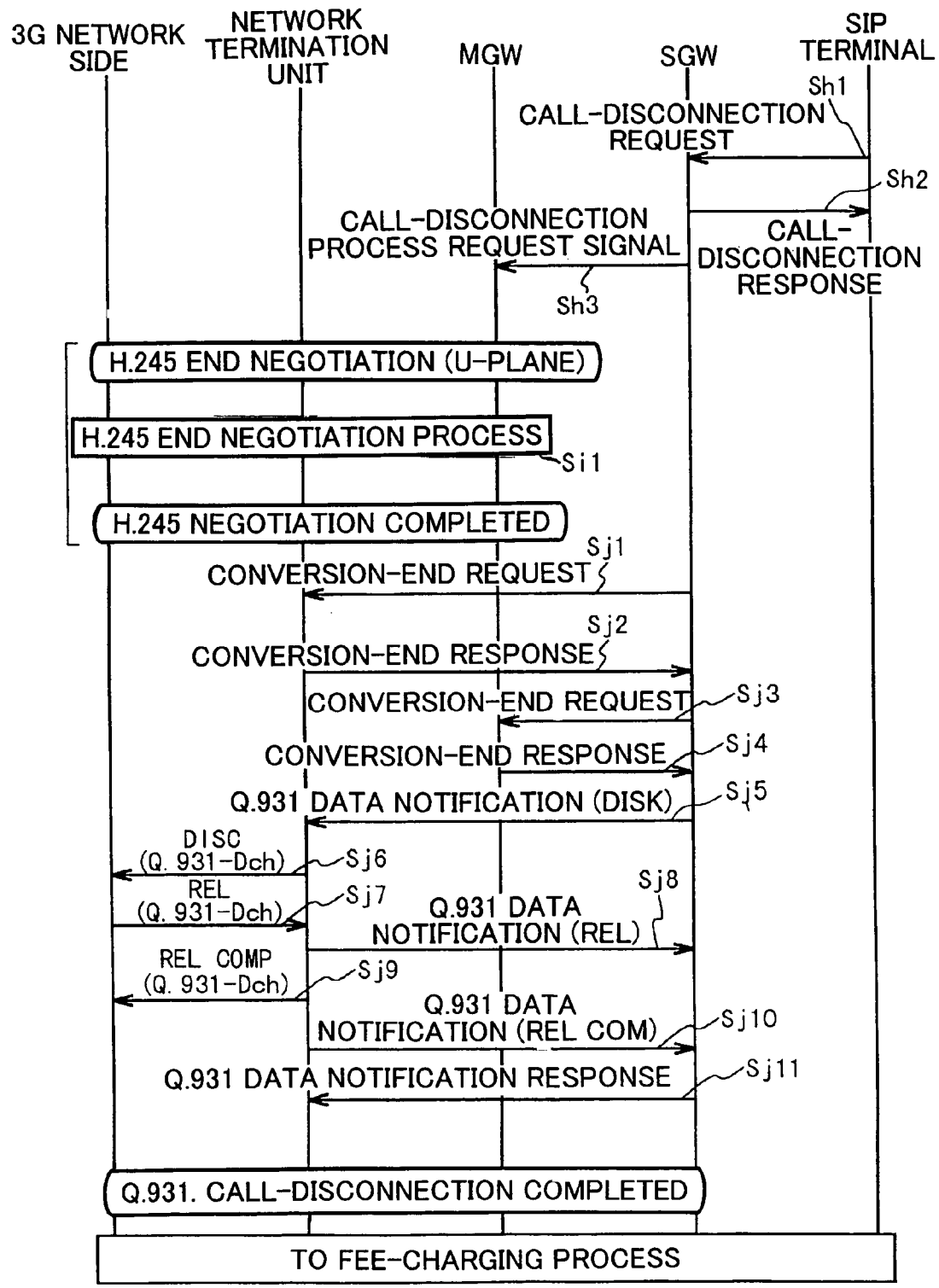
FIG. 11 illustrates a part of a call-disconnecting sequence that disconnects a call from an SIP terminal that initiates a telephone talk, in the case where the fee is charged on a user of the SIP terminal.
Figure 12:
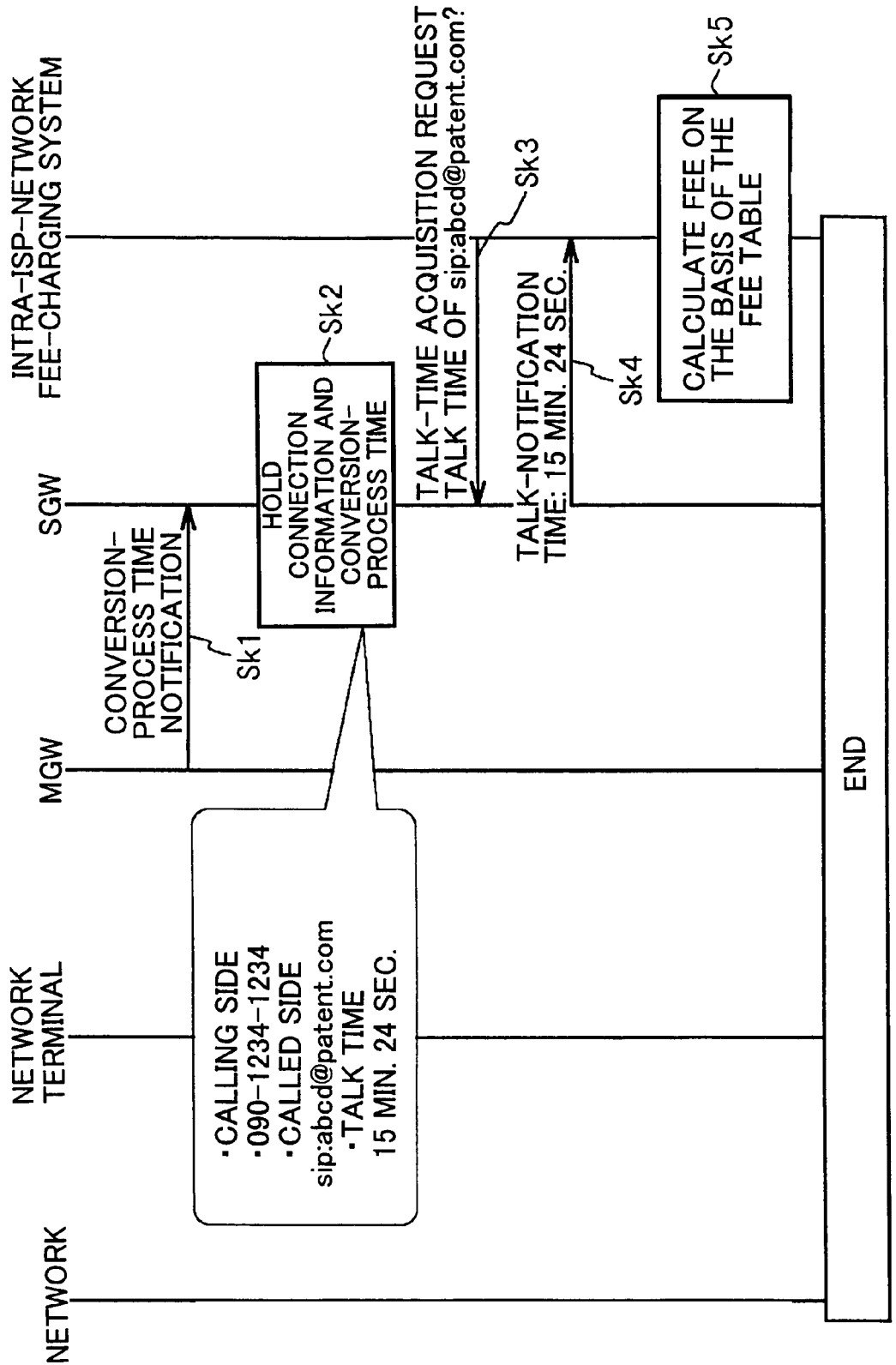
FIG. 12 illustrates the remaining part of the call-disconnecting sequence that disconnects a call from an SIP terminal that initiates a telephone talk, in the case where the fee is charged on a user of the SIP terminal.

A call-disconnecting sequence that is performed in the case where a talk is started as the SIP terminal 12 makes a call and the fee is charged on the SIP terminal 12 will be described with reference to FIGS. 11 and 12. In this instance, the SIP terminal 12 disconnects the call. Nevertheless, it does not matter which side disconnects the call, the SIP terminal 12 or the 3G network 11.

A call-disconnection request signal Sh1 is input from the SIP terminal 12 to the signaling gateway 4. In response to the call-disconnection request signal Sh1, the signaling gateway 4 sends a call-disconnection response signal Sh2 back to the SIP terminal 12. In response to the call-disconnection request signal Sh1, too, the signaling gateway 4 transmits a call-disconnection process request signal Sh3 to the media gateway 5. Upon receipt of the call-disconnection process request signal Sh3, the media gateway 5 performs an end-negotiation process Si1.

Further, the signaling gateway 4 transmits a conversion-end request signal Sj1 to the 3G-network termination unit 31. The 3G-network termination unit 31 transmits a conversion-end response signal Sj2 back to the signaling gateway 4 if the conversion process has ended. The signaling gateway 4 then transmits a conversion-end request signal Sj3 to the media gateway 5. The media gateway 5 sends a conversion-end response signal Sj4 back to the signaling gateway 4 if the conversion process has ended.

Further, a disconnection (DISC) signal Sj5 using Q.931 is input from the signaling gateway 4 to the 3G-network termination unit 31. The 3G-network termination unit 31 inputs a disconnection (DISC) signal Sj6 to the 3G network through the D channel of Q.931. In response to the disconnection signal Sj6, the 3G network sends a release (REL) signal Sj7 back to the 3G-network termination unit 31 through the D channel of Q.931.

A Q.931 notification Sj8 containing the release signal (REL) is transmitted from the 3G-network termination unit 31 to the signaling gateway 4.

In response to the release (REL) signal Sj7, the 3G-network termination unit 31 sends a release-completion (RELCOMP) signal Sj9 back to the 3G network through the D channel of Q.931. The 3G-network termination unit 31 transmits the release-completion (RELCOMP) signal Sj9 to the signaling gateway 4, too. The signal gateway 4 sends back a Q.931-data notification response signal Sj11, whereby the Q.931 call disconnection is completed.

When the call disconnection is completed, the media gateway 5 transmits a conversion-process time notification Sk1 to the signaling gateway 4, said notification Sk1 containing the time of conversion process, i.e., the time spent in converting data to achieve the end-to-end (terminal to terminal) talk. In some cases, the time of conversion process may be detected by the conversion-process information detecting section 21. The signaling gateway 4 holds the conversion-process time, in association with the connection information that contains the ID of the calling terminal and the ID of the called terminal. Alternatively, the conversion-process time is stored in the processed data 28 in the memory unit 25.

In some cases, the amount of data processed may be used in place of the conversion process time.

The fee-charging system provided in the calling-side network (i.e., intra-ISP-network fee-charging system 14 in this case) transmits a talk-time acquisition request for the terminal ID of the calling side, to the signaling gateway 4. The signaling gateway 4 transmits a talk-time notification Sk4 to the intra-ISP-network fee-charging system 14.

The intra-ISP-network fee-charging system 14 calculates the fee for the talk, on the basis of a fee table, and charges the fee on the subscriber who has the SIP terminal 12 that has made a call. The intra-ISP-network fee-charging system 14 may be configured to send part of the fee received from the subscriber, to the intra-3G-network fee-charging system 13 incorporated in the 3G network 11. Thus, an access can be made to the 3G network 11 from any other network, by making a payment to the 3G network 11.

Moreover, fees based on the time of using the other network can be paid.

In this way, the gateway 3 detects the time of conversion process or the amount of data processed to achieve the end-to-end (terminal to terminal) talk via the media gateway 5, and sends the time of conversion process or the amount of data processed, to the fee-charging system of the calling side. This makes it possible to charge fees for communication between the networks of different types. Additionally, fees may not be charged when the ability exchanges fails.

The method of transmitting and receiving signals, described above, is determined by the network and protocol that is used. Nonetheless, the signals may be transmitted and received by any other method. Moreover, the communication within each network is carried out in accordance with the communication protocol specific to the network, and will not be described here.

Figure 13:
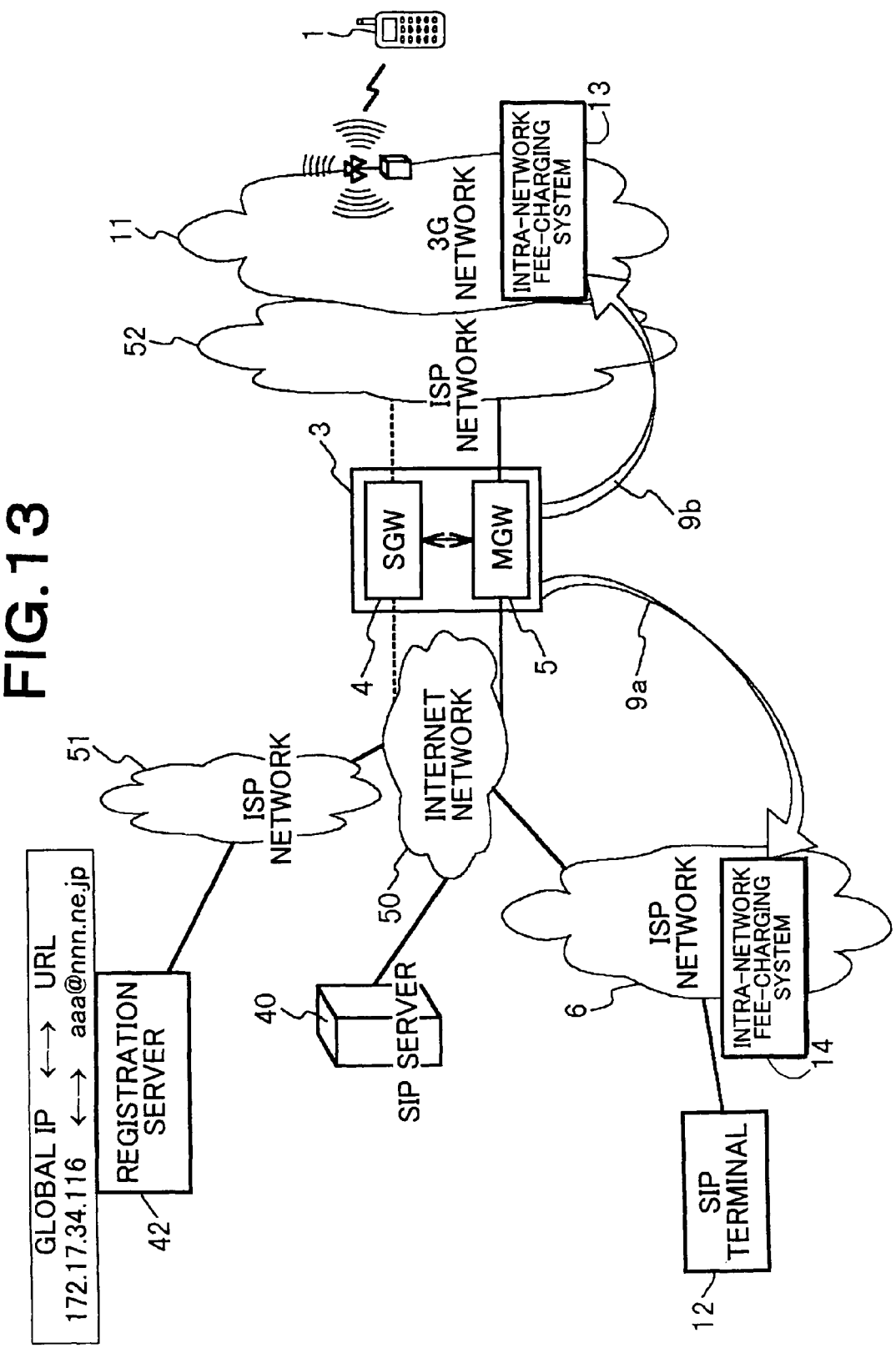
FIG. 13 shows another way of connecting the networks of different types.

As shown in FIG. 13, the gateway 3 may be connected to the 3G network 11 via an ISP network 52 and may further be connected to the ISP network 6 via the Internet 50. The ISP network 6 comprises a register server 42 that is provided in the network 6 or connected to an ISP network 52 connected to the Internet 50. The ISP network 6 performs conversion between global IP and URL. Further, the ISP network 6 may comprise an SIP server 40 in some cases.

Figure 14:
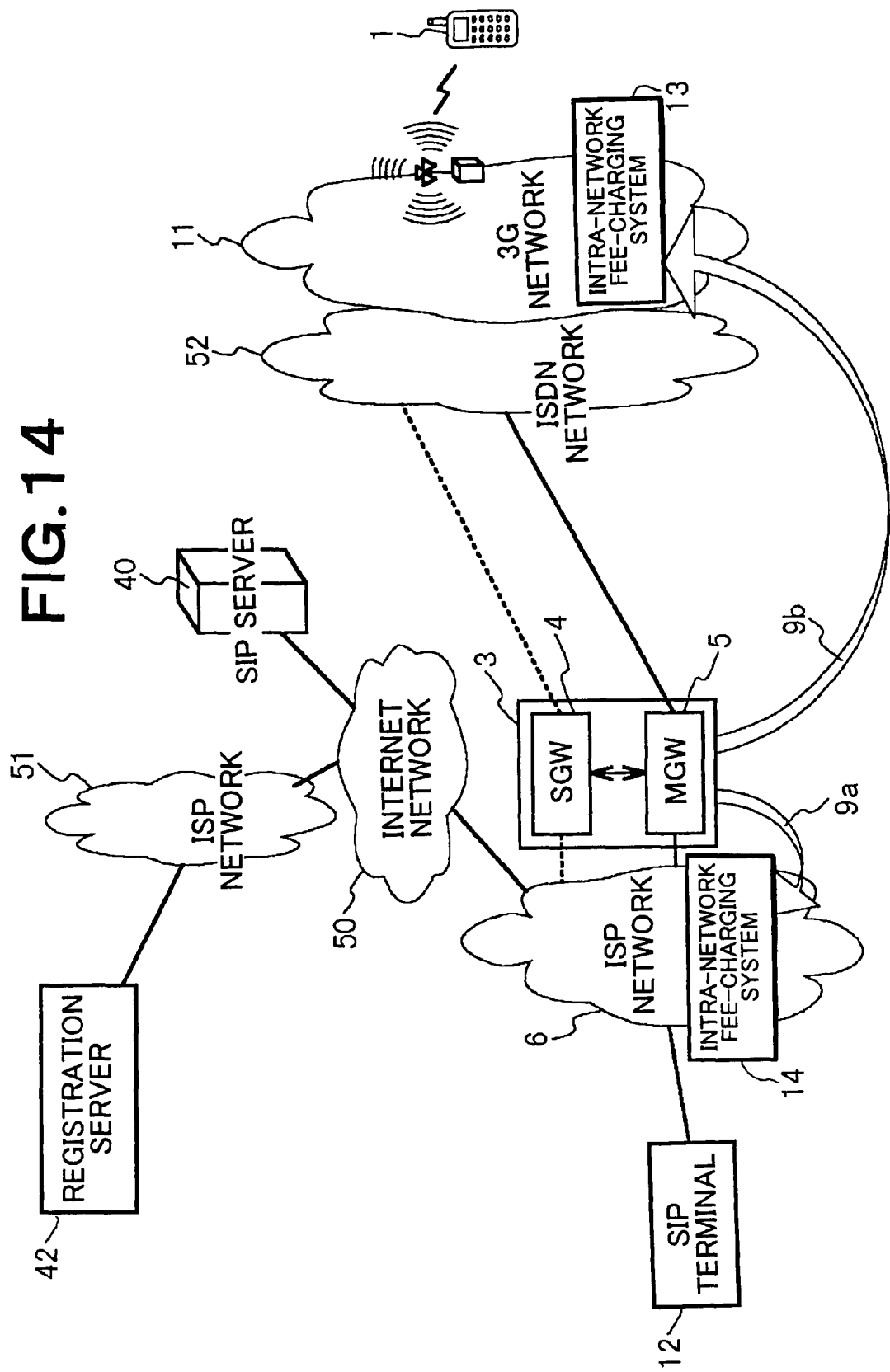
FIG. 14 shows still another way of connecting the networks of different types.

As FIG. 14 shows, the gateway 3 may be connected to the ISP network 6 and also to the 3G network 11 via the ISDN network 52, in some cases.

As mentioned above, the provider who owns the 3G network 11 and the ISDN network 52 can install the gateway 3 and connect the gateway 3 to other networks. The provider who owns the ISP network 6 can install the gateway 3 and connect the gateway 3 to other networks.

In the above description, the mobile telephone network that distributes video data and audio data is the 3G network 11. Nevertheless, the mobile telephone network is not limited to the 3G network 11. Rather, any network other than the 3G network 11 can be employed, only if it is a telephone network that can distribute video data and/or audio data. Furthermore, the regulations are not limited to, for example, Q.931, AMR, G.731.1, MPEG4, H.263 and H.245. Other regulations that include similar functions can be utilized.

As has been described, the present invention is based on the fact that CODEC conversion or protocol conversion is required in communication between networks of different types. The CODEC conversion or the protocol conversion is an operation that starts only when the communication between terminals of different types becomes possible. The start of this operation means that communication between the terminals has started. Thus, if a fee is charged on the basis of the time spent to achieve the conversion in the media gateway 5, it is possible to solve the problem that the fee is charged when only ability exchange is performed but communication is not achieved between the terminals.

Only the signaling gateway 4 and media gateway 5 that act as interface between the networks of different types know the condition in which the networks are connected to each other. The present invention is based on this fact. That is, the fee-charging systems are devised to charge fees on the basis of the connection information and conversion-process time information that have been obtained at the signaling gateway 4 and media gateways 5, respectively. Even if no fee-charging systems are available to charge fees for connection on the calling side, the fees can be charged. Further, an interface can be provided between any two networks if it is necessary to charge a fee for an access from one network to the other network.

Moreover, it is possible to determine in the conversion process, which communication data is being converted. Therefore, the fee for packet communication can be calculated by detecting the data packets converted and adding all data packets converted.

The system for charging fees for the communication between networks of different types, according to the present invention, can generate information for use in charging fees even if the network to which a calling terminal is connected has no system for charging fees on the basis of connection.

The system for charging fees for the communication between networks of different types, according to the present invention, can generate information for use in charging fees on the basis of communication time even if it is difficult to charge fees on the basis of communication time in the network to which a calling terminal is connected.

The system for charging fees for the communication between networks of different types, according to the present invention, can generate information for use in charging fees if ability exchange is successfully achieved before the communication is performed.

What is claimed is:

1. A gateway for connecting a first network and a second network using a signal format different from that of the first network, said gateway comprising an operation unit that comprises:
    a conversion section configured to convert a first signal used in the first network to a second signal used in the second network, and the second signal used in the second network to the first signal used in the first network, when communication is performed between a terminal connected to the first network and a terminal connected to the second network;
    a detection section configured to detect as conversion-process information a time, after ability exchange is performed, that said conversion section spent to perform CODEC conversion or protocol conversion of the first signal or the second signal; and
    a network-connecting section configured to connect to at least one of the first network and the second network and configured to transmit the conversion-process information to a fee-charging system of the first network or to a fee-charging system of the second network,
    wherein the gateway is configured to detect the conversion-process information after the terminal of the first network and the terminal of the second network have been connected to each other.

2. The gateway according to claim 1, wherein said conversion section converts at least one of a call-control signal generated by call-connection signaling, an audio signal generated by an audio CODEC and a video signal generated by a video CODEC.

3. The gateway according to claim 2, wherein said conversion section comprises a signaling gateway unit configured to convert the call-control signal and a media gateway unit configured to convert the audio signal and the video signal, wherein said detecting section detects the conversion-process information used in a conversion process in the media gateway unit.

4. The gateway according to claim 2 or 3, wherein the conversion of the call-control signal is conversion between a Q.931 signal and an SIP signal, the conversion of the audio signal is conversion between an AMR bit stream and a G.723.1 signal, and the conversion of the video signal is conversion between an MPEG4 bit stream and an H.263 signal.

5. A system for charging fees for communication between networks of different types, said system comprising:
    a first terminal configured to perform a call control, the first terminal being connected to a first network;
    a second terminal configured to respond to the call control performed by the first terminal, the second terminal being connected to a second network; and
    a gateway comprising an operation unit configured to connect the first network and the second network using a second signal format different from a first signal format used by the first network, the first network comprising a fee-charging system;
    the gateway configured to convert a first signal of the first signal format from the first network to a second signal of the second signal format of the second network and to transmit the second signal to the second network, to convert the second signal from the second network to the first signal of the first network and to transmit the first signal to the first network, and to detect as conversion-process information a time, after ability exchange is performed, that is spent by the gateway to perform CODEC conversion or protocol conversion of the first signal or the second signal and to transmit the conversion-process information to the fee-charging system, and
    the fee-charging system configured to perform a fee-charging process in accordance with the conversion-process information, to charge a fee for a user of the first terminal, wherein the gateway is configured to detect the conversion-process information after the terminal of the first network and the terminal of the second network have been connected to each other.

6. The system according to claim 5, wherein the gateway detects the conversion-process information about at least one of a signal generated by an audio CODEC and a signal generated by a video CODEC.

7. A method of charging fees for communication between networks of different types, comprising the steps of:

connecting a first network and a second network using a signal format different from that of the first network by means of a gateway configured to convert a first signal from a first terminal connected to the first network to a second signal suitable for the signal format of the second network and to convert the second signal from a second terminal connected to the second network to the first signal suitable for the signal format of the first network;

detecting as conversion-process information a time, after ability exchange is performed, that is spent to perform CODEC conversion or protocol conversion of the first or second signal, said first or second signal having been transmitted after the first terminal and the second terminal have been connected to each other by the gateway;

transmitting the conversion-process information to a fee-charging system of the network to which the first terminal or the second terminal that is a calling side is connected, by the gateway; and charging a fee for a user of a calling-side terminal, the calling-side terminal being one of the first terminal and the second terminal, said fee being fixed or calculated on a basis of communication time based on the conversion-process information by the fee-charging system.

8. The method according to claim 7, wherein the conversion-process information includes at least one of the time spent to convert signals in an audio CODEC and video CODEC and the amount of data converted therein.

* * * * *